United States Patent [19]

Cherukuri et al.

[11] Patent Number: 4,933,188

[45] Date of Patent: Jun. 12, 1990

[54] CHEWING GUM COMPOSITIONS WITH IMPROVED PHYSICAL STABILITY

[75] Inventors: Subraman R. Cherukuri, Towaco, N.J.; Lucy L. Wong, Jackson Heights; Daniel A. Orlandi, Flushing, both of N.Y.; Steven M. Faust, Stanhope, N.J.

[73] Assignee: Warner-Lambert Company, Morris Plains, N.J.

[21] Appl. No.: 139,998

[22] Filed: Dec. 31, 1987

[51] Int. Cl.$^5$ .............................................. A23G 3/30
[52] U.S. Cl. ........................................ 426/3; 426/658; 426/804
[58] Field of Search ....................................... 426/3-6, 426/658, 804

[56] References Cited

U.S. PATENT DOCUMENTS

| | | | |
|---|---|---|---|
| 3,741,776 | 6/1973 | Mitsuhashi et al. | 426/599 |
| 3,915,736 | 10/1975 | Oyamada et al. | 127/29 |
| 3,918,986 | 11/1975 | Hiraiwa | 127/29 |
| 4,248,895 | 2/1981 | Stroz et al. | 426/3 |
| 4,252,830 | 2/1981 | Kehoe et al. | 426/5 |
| 4,408,041 | 10/1983 | Hirao et al. | 426/658 |
| 4,508,713 | 4/1985 | Stroz et al. | 426/3 |
| 4,514,422 | 4/1985 | Yang et al. | 426/3 |
| 4,789,559 | 12/1988 | Hirao et al. | 426/658 |

Primary Examiner—Jeanette Hunter
Attorney, Agent, or Firm—Daniel A. Scola, Jr.

[57] ABSTRACT

A sugarless, anhydrous chewing gum composition, and products made therefrom which has a firm textural integrity and a soft chew characteristic and very low-moisture content and low-moisture pick-up over time. The composition includes gum base in an amount of from 18% to about 75% by weight, and a low-moisture pick-up, texturing sweetening/bulking agent of maltitol in an amount sufficient to provide textural integrity and a soft chew characteristic over a period of time.

7 Claims, 4 Drawing Sheets

CHEWING GUM COMPOSITIONS WITH IMPROVED PHYSICAL STABILITY

The present invention relates to improved chewing gum compositions and, in particular, to sugarless compositions which deteriorate by surface wetting and embrittlement. The inventive compositions provide sugarless chewing gums product which do not pick-up excessive moisture and which simultaneously retain a soft chew characteristic.

Chewing gum compositions are, in general, composed of a water-insoluble or base portion and a water-soluble chewing gum portion which primarily contains the sweetness and flavor components. In order to provide an acceptably sweet gum product it is important to consider both of the major components of the overall gum compositions. Thus, in order to retain acceptable sweetness, flavor, and texture while retaining good shelf-life, it is important to provide an environment in which the different gum components maintain their characteristic qualities and are not degraded by moisture or other gum components. Both moisture loss and gain have been known to have particularly harmful effects on the life of gum products.

In the case of sugarless chewing gums, it has been found advantageous to provide the gum composition with low-moisture content in order to prevent deleterious affects of water on, among other things, high intensity sweeteners such as aspartame, etc.

In the past chewing gum compositions have been provided with low percentages of moisture in the final product generally by driving off the water once the chewing gum formulation has been made. Thus, for example, the prior art compositions ordinarily contain water and/or moisture-containing ingredients, i.e., sorbitol solution, corn syrup solutions, etc., and would therefore require heating or purification of the compositions to drive off water and obtain a certain moisture content. For example, U.S. Pat. No. 4,035,572 discloses a gum base formulation with less than 0.5% moisture. This level percentage of moisture is due to the purification process which removes water and salivant from the gum base.

U.S. Pat. No. 4,382,963 involves a low calorie chewing gum which uses polydextrose as the sole soluble bulking agent. The moisture content in the final product is about 1 to 5% and this is obtained by omitting the aqueous component, e.g., sorbitol syrups or corn syrups which are normally used in chewing gum products.

U.S. Pat. No. 3,262,784 discloses a chewing gum composition which has less than 1% moisture in the final product due to heating between about 170° and 250° F/ to drive off the water.

U.S. Pat. No. 4,150,161 relates to a two component confection having a carbonated candy component and a pliable bubble gum component with each component having a controlled water activity between 0.1 to 0.3 and which is capable of surviving long periods of storage when packaged in a moisture resistant material.

It is also known to provide chewing gum compositions which have low moisture content and/or low moisture pickup during storage. For example, U.S. Pat. No. 4,683,138 to Glass, et al. discloses a low moisture, sugarless, center-filled chewing gum wherein a low moisture, liquid center-fill is incorporated into a cavity within a substantially anhydrous chewing gum shell. The Glass, et al. '138 disclosure along with all the references cited therein, each one of which is incorporated herein by reference, are directed to reducing the amount of moisture in chewing gum composition whether its sugar-containing or sugarless gum.

In the case of anhydrous gum compositions, however, there still remains a problem in providing sugarless compositions with low moisture pick-up, while at the same time retaining a soft texture over a period of time which provides the consumer with a product having an acceptable chew characteristic.

The present invention, however, overcomes these problems by providing a sugarless chewing gum composition having low moisture content and pickup while maintaining a soft chew characteristic over a period of time.

SUMMARY OF THE INVENTION

The present invention is a sugarless, substantially anhydrous chewing gum composition which is unique in that it provides a firm structure which maintains its integrity over a period of time while at the same time providing a soft chew characteristic. Furthermore, the present chewing gum composition also provides low-moisture content and low-moisture pickup during storage where by the end product has a good shelf life.

The composition includes a gum base component which can be present in an amount from about 10% to about 75% based on the weight of the composition, and the composition as a whole no greater than about 3.5% by weight of moisture. Also included in the present invention is a low-moisture, texturizing sweetening-/bulking agent in an amount sufficient to provide textural integrity and a soft chew characteristic and reduced moisture pick-up over a period of time.

The bulking agent which simultaneously provides both sweetening and bulk is preferably maltitol, reduced maltose, which is included in an amount from about 28% to about 58% by weight of the overall composition. Preferably, the sweetening/bulking agent is included from an amount from about 45% to about 55%.

Other components can be included such as high intensity sweeteners in order to supplement the sweetening/bulking agent. Inasmuch as maltitol as a bulking agent has a high degree of sweetness, high intensity sweeteners can be included in amounts as little as 0.01% and can range up to about 3% based on weight. Preferably high intensity sweeteners, when included can be in an amount from about 0.025 to about only 1.5% by weight. Other components such as flavor components can also be included in an amount from about 0.05 to 3.0% based on weight.

Another component which can be included, especially since it enhances the ability of a composition to preserve the efficacy of the sweetening and flavor components, is glycerin which can be included in an amount of up to 18% based on weight. Since glycerin is hygroscopic and tends to retain and pickup moisture, it has been found that glycerin can be effectively used in very low amounts ranging from as low as about 2% up to about 14%.

Since the present chewing gum compositions provide an excellent, firm gum structure while at the same time providing soft chew characteristic, it has been found to be an excellent replacement for the sugar alcohol-containing sugarless gums, especially those prepared with sorbitol as a sweetening/bulking agent. Moreover, the present composition also exhibits very low-moisture pickup, which enhances its use with other components which tend to deteriorate or degrade in the presence of water. Thus, dipeptide sweeteners, such as aspartame, can be used with greater confidence. Furthermore, since the maltitol component has a high degree of sweetness, the need for high intensity sweeteners has also been significantly reduced. Thus, as a result of the present composition improving chewing gum products can be produced with reduced moisture pickup and embrittlement so that it retains and possesses better shelf life.

For a better understanding of the present invention together with other and further objects, reference is made to the drawings and to the following detailed description, and its scope will be pointed out in the appended claims.

DETAILED DESCRIPTION OF THE INVENTION

Figure 1:
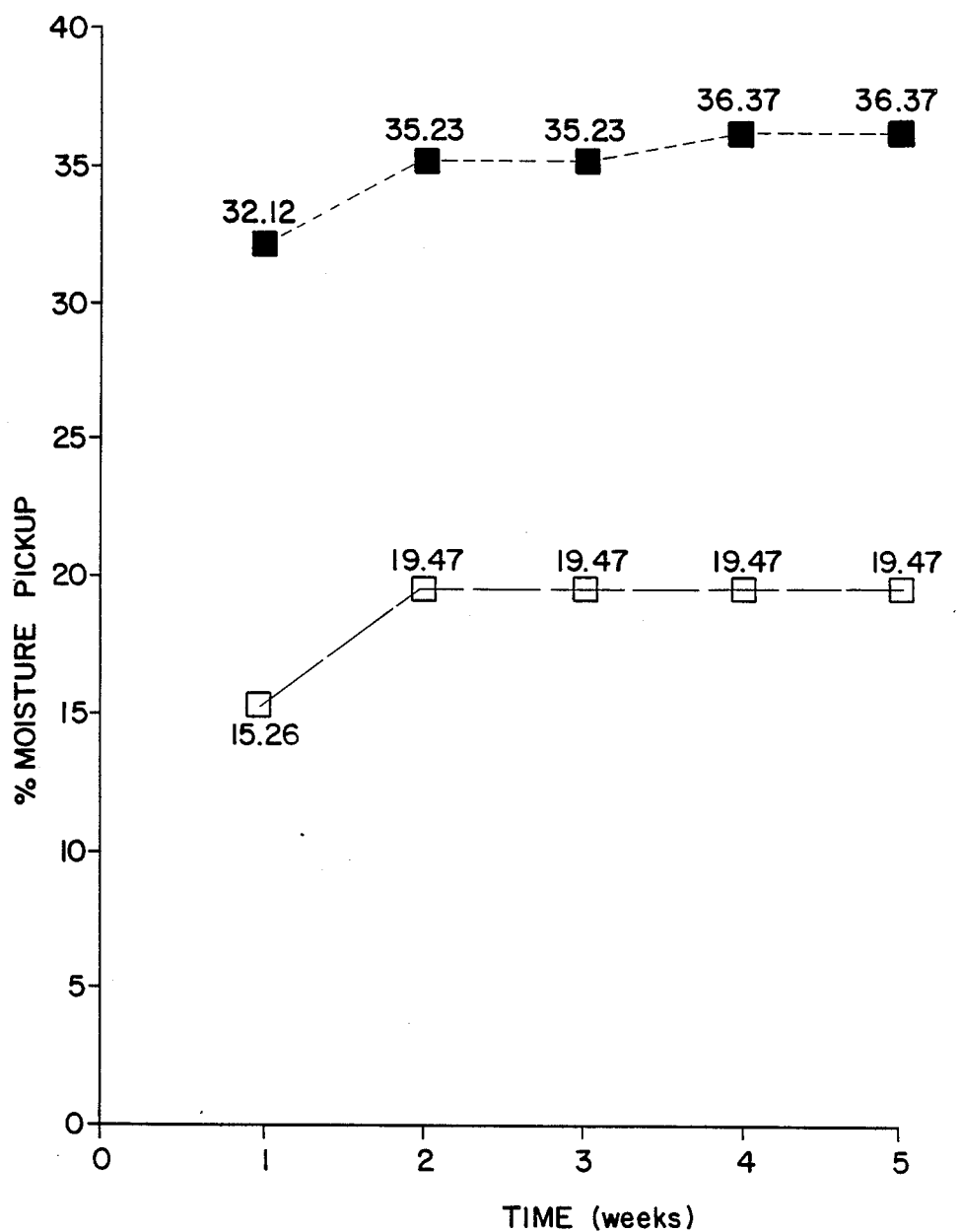
FIGS. 1 and 3 are graphs which compare the percent of moisture pickup in compositions of the present invention with popular sugarless compositions.

The low-moisture sugarless chewing gum composition of the present invention includes gum base in an amount which will vary depending on the type of gum product desired, the consistency desired, as well as the elastomeric properties. In general, the base can be included in the final chewing gum composition product and amounts from about 10 to about 75% by weight of the final chewing gum product composition, with preferred amounts being from about 15 to about 40%, and most preferably of from about 23 to about 35% by weight.

In particular, the elastomer component of the gum base of the present invention can be selected from the synthetic elastomers styrene-butadiene copolymer, polyisobutylene, isobutylene-isoprene copolymer (butyl rubber), natural rubber (polyisoprene), as well as masticatory substances of natural origin, such as rubber latex solids, chicle, crown gum, nisparo, rosidinha, jelutong, pendare, perillo, niger gutta, tunu, etc. Mixtures of these materials are also useful.

The resin component, on the other hand, can be selected from polyvinyl butyl ester, copolymers of vinyl esters and vinyl ethers, polyethylene, ethylene-vinyl acetate copolymers, vinyl acetate-vinyl alcohol copolymers, vinyl acetate vinyl laurate copolymers, and in particular high molecular weight polyvinyl acetate, which is at least about 20,000 MWU.

The gum base usually includes an elastomer solvent, which may be selected from terpene resins, such as polymers of alpha-pinene or beta-pinene; rosin derivatives including hydrogenated or partially hydrogenated derivatives, such as the glycerol ester of polymerized rosin, alcohol esters of rosin, such as the glycerol ester of hydrogenated rosin, the pentaerythritol ester of hydrogenated rosin, the glyceryl ester of rosin and mixtures thereof.

The base may include an oleaginous plasticizer, such as hydrogenated vegetable oil, cocoa butter, natural waxes, petroleum waxes such as the polyethylene waxes, paraffin waxes, and microcrystalline waxes with melting points higher than 80° C., or mixtures thereof. These materials may be utilized generally as softeners.

The gum base may include mineral adjuvants such as calcium carbonate, magnesium carbonate, alumina, aluminum hydroxide, aluminum silicate, talc, tricalcium phosphate and the like; as well as mixtures thereof. These mineral adjuvants may serve as fillers and texturizing agents.

Fatty acids may also be included, to serve as softeners, and suitable fatty acids would include stearic acid, palmitic acid, oleic acid, and mixtures thereof. The gum bases also frequently include emulsifiers, particularly those that would be compatible with the vinyl polymer, if included in the base. Particularly, lecithin, glyceryl monostearate, fatty acid monoglycerides, diglycerides and triglycerides, glycerol triacetate, propylene glycol monostearate and mixtures thereof may be used.

The gum base composition may also include conventional additive such as antioxidants, preservatives, colorants and the like. For example, titanium dioxide may be utilized as a colorant, and an antioxidant such as butylated hydroxytoluene, butylated hydroxyanisole, propyl gallate, and mixtures thereof, may also be included Naturally, the gum bases may be prepared for a variety of products, including conventional gums and bubble gums, and the invention is not limited to a specific gum base formulation.

In the past, it has been found useful to use sugar alcohols such as those selected from the group consisting of sorbitol, mannitol, xylitol and mixtures thereof. The sugar alcohols were added as substantially anhydrous mixtures or components to gum compositions in a bulking-amount which bestowed on the composition an unwanted degree of moisture pick-up, both short and long term In accordance with the present invention, while it is always possible to include sugar alcohols, it is preferable to replace nearly all the sugar alcohol with the bulking sweetening agent maltitol Therefore, sugar alcohol can be included in an amount of up to about 10%, and preferably no greater than about 8%.

As previously mentioned, high intensity sweeteners can also be incorporated in the present chewing gum composition. However, unlike many sugarless gum compositions, it is not necessary to rely on the high intensity sweeteners as the primary sweeteners, although they may be used as such. When used, the high intensity sweeteners can include saccharin and its various salts such a sodium or calcium salts; cyclamic acid and its various salts such as the sodium salt; the dipeptide sweeteners such as aspartame; amino acid based sweeteners; dihydrochalcone; glycyrrhizin; *Stevia rebaudiana* (Stevioside); chlorinated sucrose derivatives such as sucralose; lycasin; and other high intensity sweeteners. Since the high intensity sweeteners need not be the primary sweeteners in the present compositions, they can be included in amounts as low as 0.01 to about 3% by weight, and are preferably included in amounts from 0.025 to only about 1.5% by weight.

Other conventional ingredients which may be added to the composition of the present invention include a flavor component such as flavoring agents selected from the group consisting of natural or synthetic flavor oils and extracts derived from plants, leaves, flowers, fruits and so forth, and combinations thereof. Representative flavor agents include: spearmint oil, cinnamon oil, oil of wintergreen (methylsalicylate) and peppermint oils. Also considered useful are the natural or synthetic fruit flavors such as citrus oil including lemon, orange, grape, lime and grapefruit and fruit essences including apple, strawberry, cherry, pineapple and so forth. Other ingredients which are useful in the flavor component include citric acid, malic acid, tartaric acid and the like, as well as mixtures thereof.

Although glycerin is considered to be a humectant, it has been found that it also enhances preservation of the chewing gum composition as a whole over a period of time. Therefore it may be desirable to include glycerin in an anhydrous gum product even though moisture pick-up is unwanted. Accordingly, glycerin may be included in the composition in the present invention preferably in anhydrous form, such as commercially available in the United States Pharmacopoeia (USP) grade. If glycerin is included in the composition, it is preferably used up to no more than about 18%, and most preferably from about 2 to about 14% based on weight of the composition.

Key, however, to the present invention is the discovery of the ability to use a low-moisture pick-up sweetener/bulking agent which can be included in amounts to replace sugar alcohol in a sugarless gum composition to: (1) significantly reduce the moisture pick-up over a period of time and (2) to provide structural integrity simultaneously with a soft chew characteristic. In particular, the bulking sweetening agent used in the present invention is maltitol, which is reduced maltose and can be identified as 0-alpha-glucopyranosyl-D-glucitol. The chemical structure is shown below:

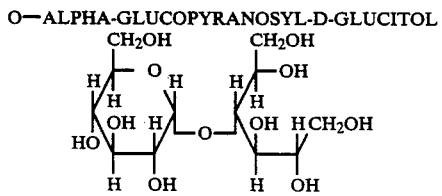

O—ALPHA-GLUCOPYRANOSYL-D-GLUCITOL

Maltitol is known to have a relative sweetness when compared to sucrose of from about 0.80 to 0.90, which makes it an ideal sweetener/bulking agent to replace the hygroscopic sugar alcohols, since little or no supplemental sweeteners need be added. Moreover, the use of maltitol provides low-moisture pick-up while at the same time enhancing the chew quality of the product even after an extended storage time.

Experiments were conducted to compare the chewing gum composition of the present invention with sugarless, anhydrous compositions prepared with sugar alcohols. The data clearly indicates the superior and unexpected results achieved by use of the compositions of the invention.

EXAMPLES

Sugarless chewing gum compositions were prepared using the following formulations.

| INGREDIENT | PERCENT BY WEIGHT | |
|---|---|---|
| | CONTROL 1 | SAMPLE 1 |
| Gum Base | 22.98% | 22.98% |
| Sorbitol | 55.57% | 0.00% |
| Mannitol | 7.07% | 7.07% |
| Maltitol | 0.00% | 55.57% |
| Glycerin | 12.00% | 12.00% |
| Softener | 0.50 | 0.50% |
| Flavorant | 1.70 | 1.70% |

| INGREDIENT | PERCENT BY WEIGHT | |
|---|---|---|
| | CONTROL 1 | SAMPLE 1 |
| Color Agent | 0.18% | 0.18% |

FIG. 1 shows the results of moisture pick-up tests conducted over a period of five weeks. Tests were conducted to determine the amount of moisture absorbed by samples maintained at a temperature of 80° F (27° C.) and at a relative room humidity of 80%. As can be seen from FIG. 1, the gums containing maltitol did not absorb as much moisture as the gums containing the sorbitol. In fact the amount of moisture picked up by the maltitol composition over five weeks is only about one-half the moisture picked up by the sorbitol compositions. This is a significant improvement over sugarless, glycerin-sorbitol containing gums which is as high as 36.37% after a five week period.

Figure 2:
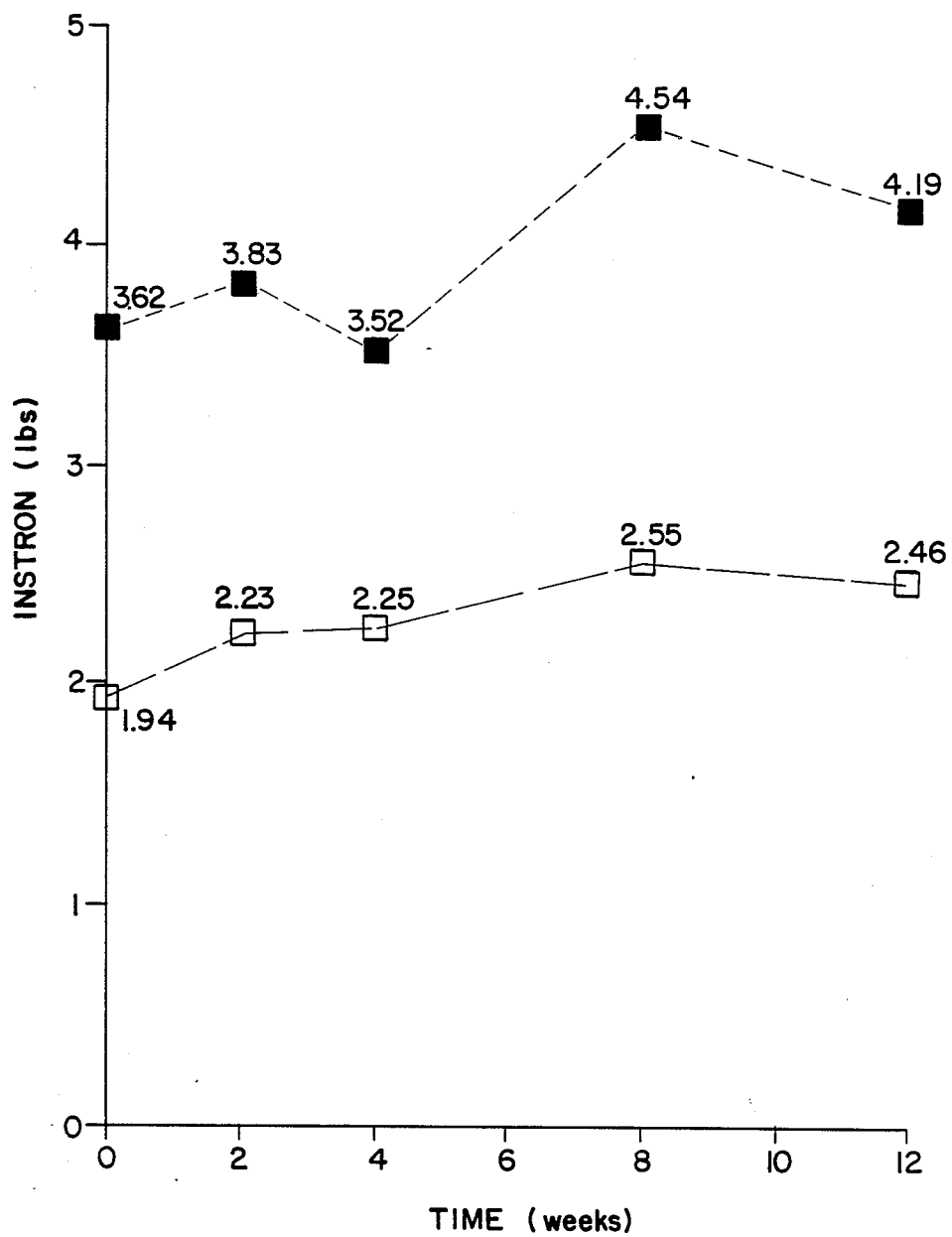
FIGS. 2 and 4 are graphs which compare the softness of compositions prepared in accordance with the present invention with the texture of popular sugarless gum compositions.

FIG. 2 depicts the results of an accelerated aging Instron test which was conducted to show the retention of a soft chew characteristic. Since each of the inventive compositions possessed sufficient structural integrity to retain a "chunk" shape, firmness to bite, or softness, was measured.

The equipment used was the Instron Model 1130 with a digital readout from Valtec Associates Inc. Pieces of gum from each of the examples were used. Initially unused gum pieces were stored in a desiccator at 23° C. and 23% room humidity. Basically a 3/16 inch plunger was brought to bear against the surface of the gum and a controlled force was exerted until penetration of the surface occurred. The results, which are measured in pounds, are shown in FIG. 2.

The gum pieces prepared in accordance with the present invention were found to be nearly twice as soft (e.g., or one-half as hard) as the control sorbitol-containing composition.

Further compositions were prepared for testing in accordance with the following formulations. Both the second control and inventive compositions were prepared in the absence of glycerin.

| INGREDIENT | CONTROL 2 | SAMPLE 2 |
|---|---|---|
| Gum Base | 17.06% | 17.06% |
| Anhydrous Mineral Adjuvant | 2.04% | 2.04% |
| Sorbitol | 45.65% | 0.00% |
| Mannitol | 17.97% | 17.97% |
| Maltitol | 0.00% | 45.65% |
| Hydrogenerated Starch Hydrolysate | 5.00% | 5.00% |
| Softener | 0.57% | 0.57% |
| Flavorant | 1.07% | 1.07% |
| Color Agent | 0.07% | 0.07% |
| Binder | 10.57% | 10.57% |

Figure 3:
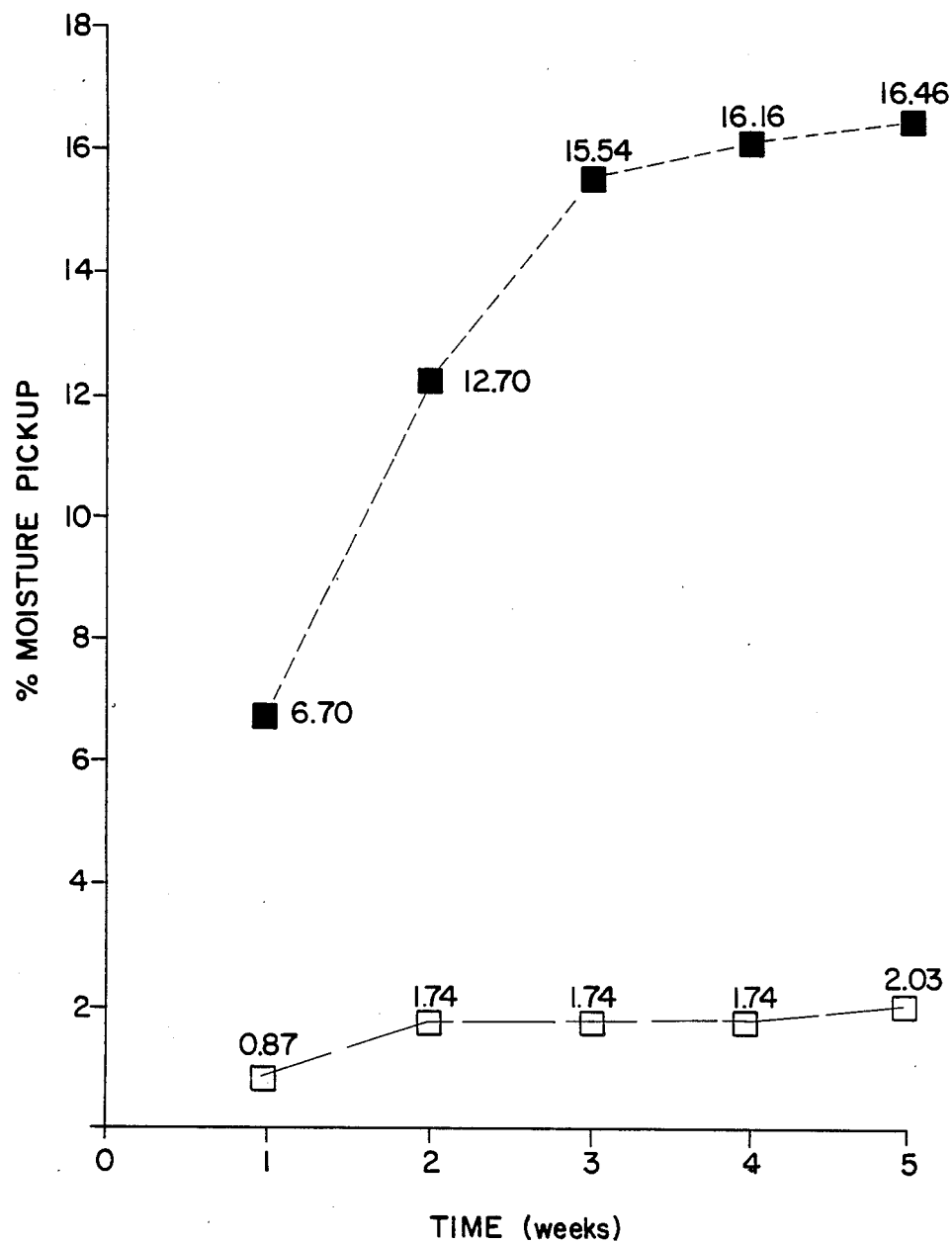
Figure 4:
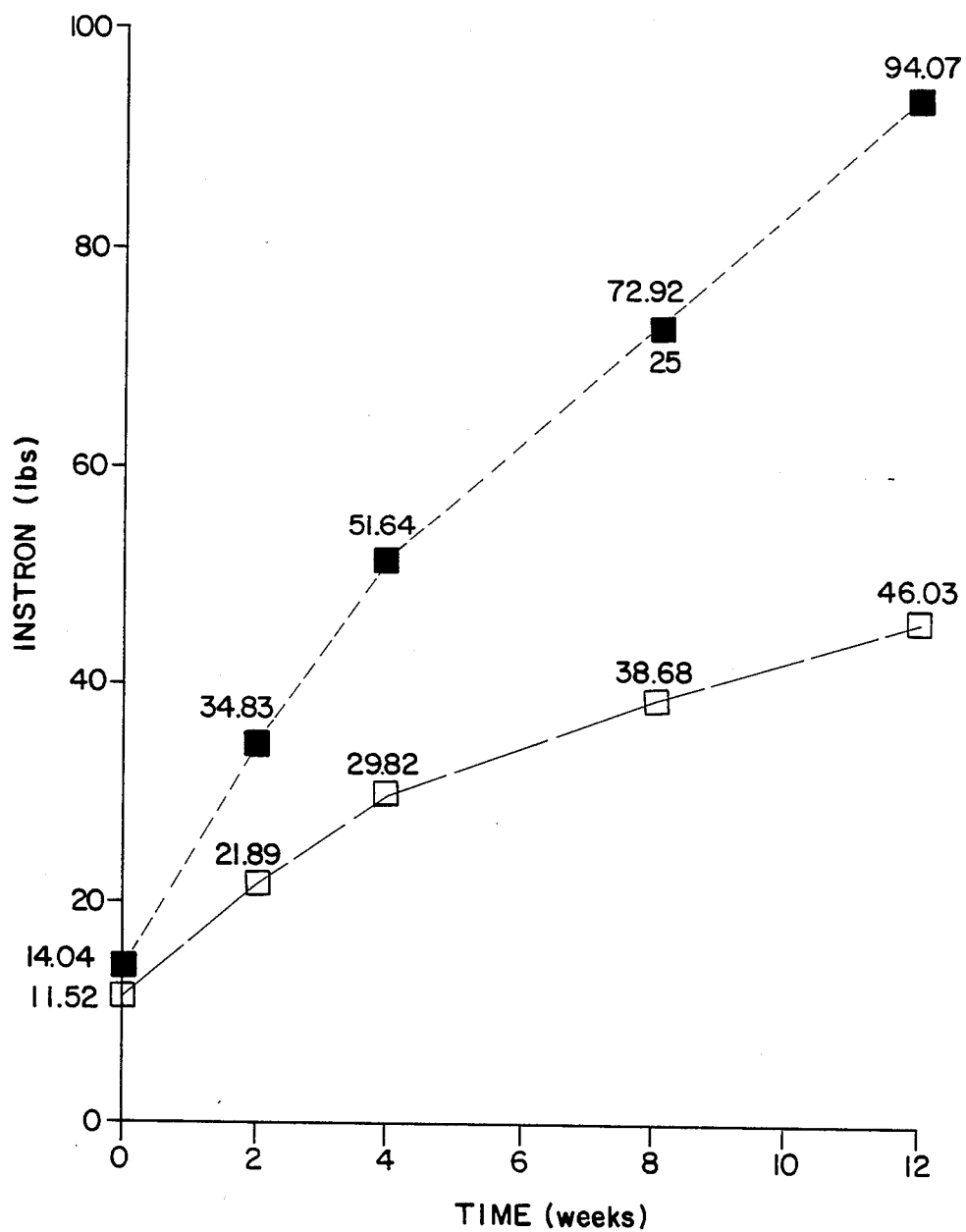

Tests were conducted on Control 2 and Sample 2 specimens as they had been conducted on Control 1 and Sample 1 specimens, and the results are shown in FIGS. 3 and 4. In FIG. 3 the moisture pick-up by the inventive composition over five weeks has been shown to be phenomenally low, e.g., only about 12% of the moisture picked up by the control specimen. FIG. 4 depicts the relative hardness developed in the specimens over a twelve week period, which is less than about one-half for the invention composition.

These results very clearly show the unusual combination of characteristics of the inventive compositions, which includes both low-moisture pick-up and softness over a period of time.

Thus, while there have been described what are presently believed to be the preferred embodiments of the present invention, other and further embodiments will be realized by those skilled in the art, and it is intended to claim such further embodiments as come within the true scope of the invention.

What is claimed is:

1. A sugarless, substantially anhydrous chewing gum composition comprising in weight percent:
    (a) a gum base in an amount of from about 10% to about 75%; and
    (b) a low-moisture pick-up, texturizing sweetening-/bulking agent consisting essentially of maltitol in an amount from about 28% to about 58% by weight;
    (c) wherein said maltitol provides to the gum composition textural integrity, a soft chew characteristic over a period of time, and reduced moisture pick-up, and maintains the gum composition in its substantially anhydrous state.

2. The composition of claim 1 wherein said sweetening/bulking agent is included in an amount of from about 45% to 55%.

3. The composition of claim 1 which further comprises a high intensity sweetener in an amount of from about 0.01 to about 3.0% based on weight.

4. The composition of claim 3 wherein said high intensity sweetener is included in an amount of from 0.025 to about 1.5%.

5. The composition of claim 1 which further comprises a flavor component in an amount from about 0.05 to about 3.0% based on weight.

6. The composition of claim 1 which further comprises glycerin in an amount up to about 18% based on weight.

7. The composition of claim 8 wherein said glycerin is included in an amount of from about 2% to about 14%.

* * * * *

REEXAMINATION CERTIFICATE (3264th)
United States Patent [19]
Cherukuri et al.

[11] B1 4,933,188
[45] Certificate Issued Jul. 15, 1997

[54] CHEWING GUM COMPOSITION WITH IMPROVED PHYSICAL STABILITY

[75] Inventors: Subraman R. Cherukuri, Towaco, N.J.; Lucy L. Wong, Jackson Heights; Daniel A. Orlandi, Flushing, both of N.Y.; Steven M. Faust, Stanhope, N.J.

[73] Assignee: Warner-Lambert Company, Morris Plains, N.J.

Reexamination Request:
No. 90/003,879, Jul. 14, 1995

Reexamination Certificate for:
Patent No.: 4,933,188
Issued: Jun. 12, 1990
Appl. No.: 139,998
Filed: Dec. 31, 1987

[51] Int. Cl.$^6$ .................................................. A23G 3/30
[52] U.S. Cl. .................................... 426/3; 426/658; 426/804
[58] Field of Search ........................... 426/3, 4, 5, 6, 426/658, 804

[56] References Cited

U.S. PATENT DOCUMENTS

| | | | |
|---|---|---|---|
| 4,248,895 | 2/1981 | Stroz et al. | 426/3 |
| 4,408,041 | 10/1983 | Hirao et al. | |
| 4,508,713 | 4/1985 | Stroz et al. | 514/60 |
| 4,514,422 | 4/1985 | Yang et al. | 426/3 |

FOREIGN PATENT DOCUMENTS

| | | |
|---|---|---|
| 1266644 | 3/1990 | Canada. |
| 0376468 | 7/1990 | European Pat. Off. . |
| 2499576 | 8/1982 | France. |
| 49-32067 | 8/1974 | Japan. |
| 3206774 | 8/1974 | Japan. |

OTHER PUBLICATIONS

T. Imfeld, et al., "Swiss Food", 6, (11), (1984) pp. 13 & ff.
"Maltitol in Powder Form From Reduction of Maltose"—Aoki Ikuo, New Food Industry, 1982, 24, No. 11 pp. 14–19, 8 tabl.—6 fig. [English Translation].
"Sugar–less Chewing Gum Based on Maltitol"—Maruyama Takashi, Terasawa Masatoshi, Takiguch Toshio—Sokubin Kogyo, (1984), 27, pp. 73–80, 7 fig.—10 tabl. [English Translation].
Japan Chemical Week, Mar. 28, 1985, p. 3.
"Lycasin for Confections" in The Manufacturing Confectioner, Dec., 1983, pp. 69–74.

*Primary Examiner*—Arthur L. Corbin

[57] ABSTRACT

A sugarless, anhydrous chewing gum composition, and products made therefrom which has a firm textural integrity and a soft chew characteristic and very low-moisture content and low-moisture pick-up over time. The composition includes gum base in an amount of from 18% to about 75% by weight, and a low-moisture pick-up, texturing sweetening/bulking agent of maltitol in an amount sufficient to provide textural integrity and a soft chew characteristic over a period of time.

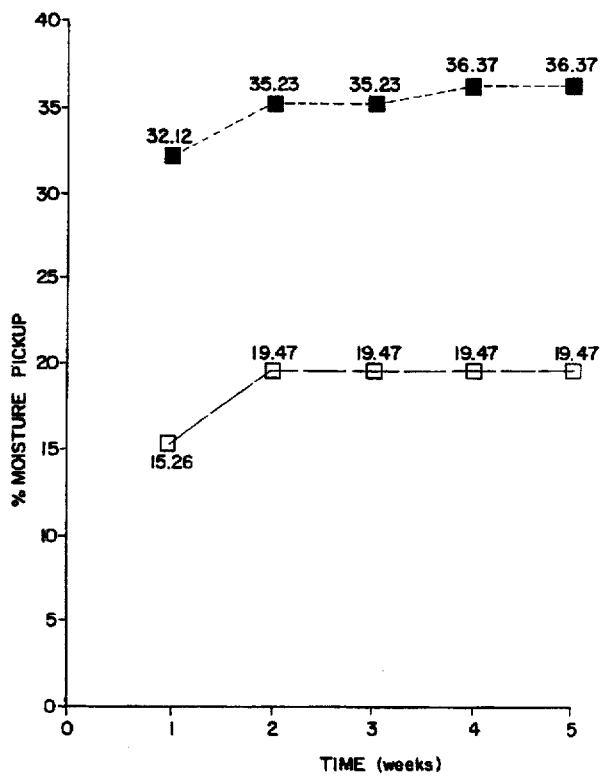

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–6 is confirmed.

Claim 7 is determined to be patentable as amended.

7. The composition of claim [8] *6* wherein said glycerin is included in an amount of from about 2% to about 14%.

* * * * *